US010230668B2

(12) United States Patent
Ji et al.

(10) Patent No.: US 10,230,668 B2
(45) Date of Patent: Mar. 12, 2019

(54) INFORMATION REPLYING METHOD AND APPARATUS

(71) Applicant: Huawei Technologies Co., Ltd., Shenzhen, Guangdong (CN)

(72) Inventors: Zongcheng Ji, Shenzhen (CN); Yibo Zhang, Shenzhen (CN); Hang Li, Hong Kong (HK)

(73) Assignee: Huawei Technologies Co., Ltd., Shenzhen (CN)

(*) Notice: Subject to any disclaimer, the term of this patent is extended or adjusted under 35 U.S.C. 154(b) by 297 days.

(21) Appl. No.: 15/163,337

(22) Filed: May 24, 2016

(65) Prior Publication Data
US 2016/0269326 A1 Sep. 15, 2016

Related U.S. Application Data

(63) Continuation of application No. PCT/CN2014/083346, filed on Jul. 30, 2014.

(30) Foreign Application Priority Data

Dec. 27, 2013 (CN) .......................... 2013 1 0740010

(51) Int. Cl.
*G06F 17/27* (2006.01)
*G06F 17/30* (2006.01)
(Continued)

(52) U.S. Cl.
CPC ........ *H04L 51/02* (2013.01); *G06F 17/30654* (2013.01); *G06F 17/30666* (2013.01);
(Continued)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 7,738,637 B2 * 6/2010 Schmandt ........... H04M 1/6505
379/202.01
7,979,414 B2 * 7/2011 George ............. G06F 17/30209
707/706
(Continued)

FOREIGN PATENT DOCUMENTS

CN 101232532 A 7/2008
CN 101252615 A 8/2008
(Continued)

*Primary Examiner* — Lamont M Spooner

(57) ABSTRACT

The information replying method includes: receiving to-be-replied information, where the to-be-replied information includes text content and contact information; searching a database for corresponding dialog style information according to the text content and the contact information; performing preprocessing on the text content, where the preprocessing includes word segmentation processing and stop word removal processing; and searching, according to data that has undergone the preprocessing, the database corresponding to the dialog style information, to determine reply information.

10 Claims, 4 Drawing Sheets

(51) Int. Cl.
*H04L 12/58* (2006.01)
*G06N 99/00* (2019.01)

(52) U.S. Cl.
CPC .. *G06F 17/30684* (2013.01); *G06F 17/30864* (2013.01); *G06F 17/30876* (2013.01); *G06N 99/005* (2013.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795
USPC .................................................. 704/1, 9, 10
See application file for complete search history.

(56) References Cited

U.S. PATENT DOCUMENTS

| | | | | |
|---|---|---|---|---|
| 2003/0050778 A1* | 3/2003 | Nguyen | ............. | G10L 15/1815 704/235 |
| 2009/0076795 A1* | 3/2009 | Bangalore | ........... | G06F 17/2785 704/9 |
| 2009/0077179 A1 | 3/2009 | Bi et al. | | |
| 2010/0217837 A1* | 8/2010 | Ansari | ................... | G06Q 30/04 709/218 |
| 2011/0208822 A1* | 8/2011 | Rathod | ................. | G06Q 30/02 709/206 |
| 2011/0288897 A1* | 11/2011 | Erhart | ............... | G06F 17/30705 705/7.13 |
| 2012/0124480 A1* | 5/2012 | Cherdron | ............... | G06Q 10/10 715/744 |
| 2012/0221962 A1* | 8/2012 | Lew | .................. | H04L 29/12896 715/752 |
| 2012/0323928 A1* | 12/2012 | Bhatia | ............ | G06F 17/302528 707/748 |
| 2013/0035946 A1* | 2/2013 | Ratan | .................. | G06F 19/3418 705/2 |
| 2013/0055088 A1* | 2/2013 | Liao | ........................ | G06F 3/048 715/730 |
| 2013/0095459 A1* | 4/2013 | Tran | .................... | A61B 5/6816 434/247 |
| 2014/0096033 A1* | 4/2014 | Blair | ........................ | G06F 3/01 715/752 |
| 2014/0179281 A1* | 6/2014 | Kim | ........................ | G06F 3/167 455/414.1 |
| 2014/0195928 A1* | 7/2014 | Carlen | .................. | G06F 3/0484 715/752 |
| 2015/0032724 A1* | 1/2015 | Thirugnanasundaram .................. G06F 17/30654 707/722 |
| 2017/0038847 A1* | 2/2017 | Schorsch | ............... | G06F 3/017 |

FOREIGN PATENT DOCUMENTS

| | | |
|---|---|---|
| CN | 101345717 A | 1/2009 |
| CN | 101470700 A | 7/2009 |
| CN | 101895607 A | 11/2010 |
| CN | 102695138 A | 9/2012 |

* cited by examiner

ID OR APPARATUS

CROSS-REFERENCE TO RELATED APPLICATIONS

This application is a continuation of International Application No. PCT/CN2014/083346, filed on Jul. 30, 2014, which claims priority to Chinese Patent Application No. 201310740010.4, filed on Dec. 27, 2013, both of which are hereby incorporated by reference in their entireties.

TECHNICAL FIELD

The present invention relates to the field of communications technologies, and in particular, to an information replying method and apparatus.

BACKGROUND

In recent years, with the development and popularization of mobile terminals (such as smartphones and tablet computers), a manner of text information interaction between people also gradually shifts from a conventional short message service to a newly-developing application, such as WeChat, Weibo, Fetion, and QQ Mobile. In a mobile terminal, both information of the conventional short message service and information of a client (such as WeChat, Weibo, Fetion, and QQ Mobile) that is installed by a user need to be replied with participation of the user. However, a biggest problem of information replying lies in that information is input quite slowly. For a mobile terminal manufacturer, providing excellent operation experience of text information interaction for users is an important way for the mobile terminal manufacturer to gain users, and designing an efficient and practical information auto-replying system on a mobile terminal greatly improves user experience on the mobile terminal.

In the prior art, in a certain scenario, an information input speed can be greatly increased by using a speech recognition based input technology, which greatly improves user experience on a mobile terminal. However, the technology is limited by a usage scenario. An accuracy rate of speech recognition in a noisy environment cannot reach a practical level, and therefore, the technology cannot satisfy all users. In addition, the input technology cannot be used in some scenarios in which speech is inappropriate but urgent replying by inputting information is needed (for example, information replying is needed in a meeting).

In an input technology based on a preset rule or mode, a reply SMS message is generally built in a system or pre-defined by a user, and after a mobile terminal receives a to-be-replied SMS message, a set SMS message is replied according to a pre-defined rule (such as having a meeting or driving). By using the input technology, some requirements of the user can be met, but not all SMS messages can be replied because the preset rule or mode is relatively fixed and quite limited. Therefore, the input technology is rarely used by people. In addition, the input technology cannot be applied to a case in which a user replies to information that is received by the user by using a client.

In conclusion, defects such as a limited applicable scope and a onefold language style exist in an existing information replying method.

SUMMARY

In view of this, one technical problem to be resolved in the present invention is how to provide an information auto-replying method and apparatus that have a wide applicable scope and can adaptively adjust a language style.

According to a first aspect, the present invention provides an information replying method, including:

receiving to-be-replied information, where the to-be-replied information includes text content and contact information;

searching a database for corresponding dialog style information according to the text content and the contact information;

performing preprocessing on the text content, where the preprocessing includes word segmentation processing and stop word removal processing; and searching, according to data that has undergone the preprocessing, the database corresponding to the dialog style information, to determine reply information.

With reference to the first aspect, in a first possible implementation manner of the first aspect, the dialog style information is dialog style information that is pre-stored in a mobile terminal, or the dialog style information is dialog style information that is generated by the mobile terminal when the mobile terminal responds to a user operation.

With reference to the first aspect, in a second possible implementation manner of the first aspect, the searching, according to data that has undergone the preprocessing, the database corresponding to the dialog style information, to determine reply information includes:

obtaining a candidate information replying 2-tuple by retrieving, according to the data that has undergone the preprocessing, the database corresponding to the dialog style information; and determining the reply information from the information replying 2-tuple.

With reference to the second possible implementation manner of the first aspect, in a third possible implementation manner of the first aspect, the determining the reply information from the information replying 2-tuple includes:

if multiple information replying 2-tuples are obtained by retrieving the database corresponding to the dialog style information, reranking the multiple information replying 2-tuples according to a reranking model; and determining the reply information from the information replying 2-tuples that have undergone the reranking.

With reference to the third possible implementation manner of the first aspect, in a fourth possible implementation manner of the first aspect, the method further includes:

training, by means of learning, the reranking model according to a first set period and according to data in the database.

With reference to the second possible implementation manner of the first aspect, in a fifth possible implementation manner of the first aspect, the searching, according to data that has undergone the preprocessing, the database corresponding to the dialog style information, to determine reply information further includes:

performing statistical data analysis on data in the database according to a second set period to obtain statistical information of a word in the to-be-replied information, where the word is obtained after the word segmentation processing is performed on the text content in the to-be-replied information; and obtaining the candidate information replying 2-tuple by retrieving, according to the data that has undergone the preprocessing and the statistical information, the database corresponding to the dialog style information.

With reference to any one of the first aspect and the first to the fifth possible implementation manners of the first aspect, in a sixth possible implementation manner of the first aspect, the method further includes:

performing dialog style analysis on the to-be-replied information and the reply information, and performing the preprocessing on the reply information; and storing dialog style information that is obtained after the analysis, the data that has undergone the preprocessing, and original data into the database, where the original data includes the text content and the contact information of the to-be-replied information, and text content and contact information of the reply information.

According to a second aspect, the present invention provides an information replying apparatus, including:

a receiving unit, configured to receive to-be-replied information, where the to-be-replied information includes text content and contact information;

a search unit, connected to the receiving unit, and configured to search a database for corresponding dialog style information according to the text content and the contact information;

a processing unit, connected to the search unit, and configured to perform preprocessing on the text content, where the preprocessing includes word segmentation processing and stop word removal processing; and a determining unit, connected to the processing unit, and configured to search, according to data that has undergone the preprocessing, the database corresponding to the dialog style information, to determine reply information.

With reference to the second aspect, in a first possible implementation manner of the second aspect, the dialog style information is dialog style information that is pre-stored in a mobile terminal, or the dialog style information is dialog style information that is generated by the mobile terminal when the mobile terminal responds to a user operation.

With reference to the second aspect, in a second possible implementation manner of the second aspect, the determining unit further includes:

a retrieving unit, connected to the processing unit, and configured to obtain a candidate information replying 2-tuple by retrieving, according to the data that has undergone the preprocessing, the database corresponding to the dialog style information, where the determining unit is further configured to determine the reply information from the information replying 2-tuple.

With reference to the second possible implementation manner of the second aspect, in a third possible implementation manner of the second aspect, the determining unit further includes:

a ranking unit, connected to the retrieving unit, and configured to: if multiple information replying 2-tuples are obtained by retrieving the database corresponding to the dialog style information, rerank the multiple information replying 2-tuples according to a reranking model, where the determining unit is further configured to determine the reply information from the information replying 2-tuples that have undergone the reranking.

With reference to the third possible implementation manner of the second aspect, in a fourth possible implementation manner of the second aspect, the apparatus further includes:

a training unit, configured to train, by means of learning, the reranking model according to a first set period and according to data in the database.

With reference to the second possible implementation manner of the second aspect, in a fifth possible implementation manner of the second aspect, the determining unit further includes:

a statistical analysis unit, configured to perform statistical data analysis on data in the database according to a second set period to obtain statistical information of a word in the to-be-replied information, where the word is obtained after the word segmentation processing is performed on the text content in the to-be-replied information, where the determining unit is further configured to obtain the candidate information replying 2-tuple by retrieving, according to the data that has undergone the preprocessing and the statistical information, the database corresponding to the dialog style information.

With reference to any one of the second aspect and the first to the fifth possible implementation manners of the second aspect, in a sixth possible implementation manner of the second aspect, the apparatus further includes:

an analysis unit, connected to the determining unit, and configured to perform dialog style analysis on the to-be-replied information and the reply information, and perform the preprocessing on the reply information; and a storage unit, connected to the analysis unit, and configured to store dialog style information that is obtained after the analysis, the data that has undergone the preprocessing, and original data into the database, where the original data includes the text content and the contact information of the to-be-replied information, and text content and contact information of the reply information.

In the information replying method according to embodiments of the present invention, a dialog style is determined by using to-be-replied information, and a database corresponding to the dialog style is searched, according to data that has undergone preprocessing, for appropriate reply information for a user to perform selection. Therefore, time for replying the information by the user can be shortened, and user experience can be improved.

According to the following detailed descriptions of exemplary embodiments with reference to accompanying drawings, other features and aspects of the present invention become clearer.

BRIEF DESCRIPTION OF THE DRAWINGS

Accompanying drawings that are included in the specification and that constitute a part of the specification together with the specification illustrate exemplary embodiments, features, and aspects of the present invention, and are used to explain the principle of the present invention.

DETAILED DESCRIPTION

The following describes various exemplary embodiments, features, and aspects of the present invention in detail with reference to the accompanying drawings. Identical reference signs in the accompanying drawings indicate components that have same or similar functions. Although various aspects of the embodiments are shown in the accompanying drawings, unless otherwise specified, the accompanying drawings are not necessarily drawn to scale.

The specialized word "exemplary" herein means "serving as an example, embodiment, or illustrative". Any embodiment described herein for an "exemplary" purpose does not need to be explained as being superior to or better than other embodiments.

In addition, to better describe the present invention, many specific details are provided in the following specific implementation manners. A person skilled in the art should understand that the present invention can still be implemented without certain specific details. In some other embodiments, methods, means, components, and circuits well known by a person skilled in the art are not described in detail, so that a main purpose of the present invention is highlighted.

Figure 1:
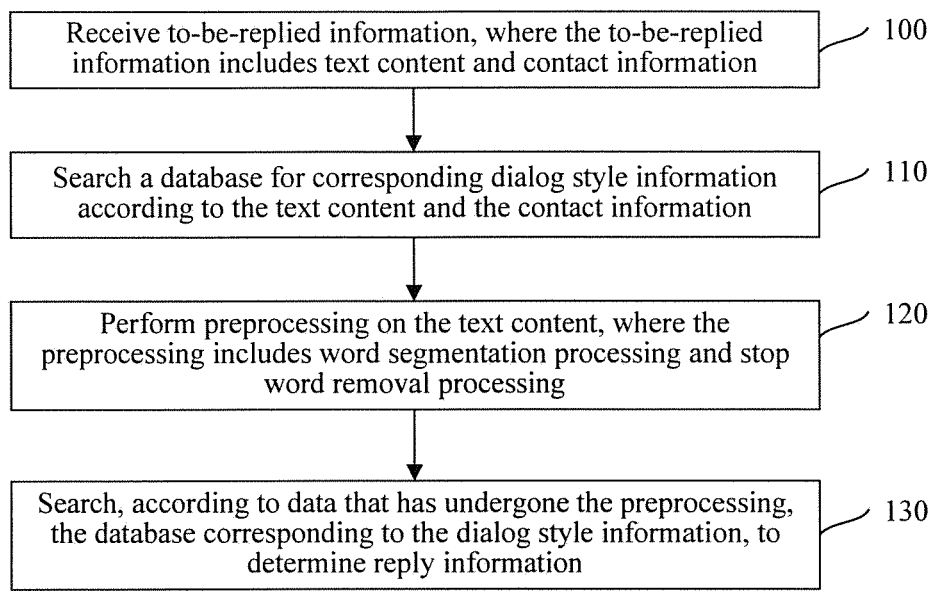
FIG. 1 shows a flowchart of an information replying method according to an embodiment of the present invention.

FIG. 1 shows a flowchart of an information replying method according to an embodiment of the present invention. As shown in FIG. 1, the information replying method may mainly include the following steps:

Step 100: Receive to-be-replied information, where the to-be-replied information includes text content and contact information.

Step 110: Search a database for corresponding dialog style information according to the text content and the contact information.

Specifically, when a user uses a mobile terminal (such as a mobile phone and a tablet computer), in addition to communicating with another person by using an SMS message, the user may also communicate with another person by using various application clients (such as QQ Mobile, WeChat, and Weibo) after installing the various application clients in the mobile terminal. After receiving to-be-replied information that is sent by another person by using an SMS message or an application client, the user may read text content and contact information included in the to-be-replied information from the to-be-replied information, where the text content is content in the to-be-replied information, and the contact information is related information, such as a name, a telephone number, and group information, of the contact, where the related information of the contact is stored in the mobile terminal by the user.

In a possible implementation manner, a database may be stored in the mobile terminal. In the database, text content that is generated in a process in which the user communicates with another person by using an SMS message or an application client may be stored according to different dialog styles. In the database, the text content may be stored in a form of an information replying 2-tuple. For example, the dialog styles may be set to a "respectful style for superiors/elders", a "casual style for friends/colleagues", an "intimate style for family members", and the like. If a superior, Wang, of the user sends, to the user by means of an SMS message, an SMS message: Help me to book one air ticket, the user replies: Please wait a minute, I will get it done for you soon. Information 1 "Help me to book one air ticket" and a reply 1 "Please wait a minute, I will get it done for you soon" may be stored in a dialog style database 1 for the "respectful style for superiors/elders".

It should be noted that, the dialog style information may be dialog style information that is pre-stored in the mobile terminal, namely, dialog style information that is pre-stored in a development stage of the mobile terminal, or the dialog style information may be dialog style information that is generated by the mobile terminal when the mobile terminal responds to a user operation, that is, in a process in which the user uses the mobile terminal, the user may modify pre-stored dialog style information according to a need of the user, and set dialog style information that can better meet the need of the user, which helps to improve user experience on the mobile terminal.

When the user receives the to-be-replied information, the database may be searched for current dialog style information according to the text content and the contact information in the to-be-replied information, so that appropriate reply information may be found in the database corresponding to the dialog style information. For example, the user receives information: Help me to book one air ticket, sent from a friend, Liu, text content is: Help me to book one air ticket, contact information may include a name: Liu, a group: Friends, and the like; and it may be found, in the database according to the text content and the contact information, that a current dialog style information is a "casual style for friends/colleagues".

Step 120: Perform preprocessing on the text content, where the preprocessing includes word segmentation processing and stop word removal processing.

Specifically, after the current dialog style information is found, the preprocessing may be performed on the text content in the to-be-replied information, where the preprocessing may include the word segmentation processing and the stop word removal processing on the text content. Different text content is constituted of several words or phrases. The word segmentation processing is splitting the text content according to words or phrases. For example, "Help me to book one air ticket" may be changed into "Help/me/to book/one/air ticket" after the word segmentation processing. In addition, the text content may include some stop words, such as a word "of" and words "and the like". These stop words have no influence on a query result, and therefore, these stop words may be removed by means of the stop word removal processing. In this way, workload of a searching process may be lightened, and an operating speed of a system may be increased.

Step 130: Search, according to data that has undergone the preprocessing, the database corresponding to the dialog style information, to determine reply information.

Specifically, after the preprocessing, original text content in the to-be-replied information may be changed into query information that is obtained after processing, so that the query information is used for searching the database corresponding to the dialog style information, and therefore the reply information that may be replied by the user is determined, where the dialog style information is the dialog style information that is found in step 110.

In the mobile terminal, different dialog styles are set by making full use of contact information stored by the user and generated dialog data, and the generated dialog data is separately stored in a corresponding database according to the dialog style information. In this way, the dialog data of the user does not need to be uploaded to a remote cloud, which helps to protect privacy of the user, and the foregoing steps in this embodiment may be directly performed by the mobile terminal used by the user, which further protects the privacy of the user.

According to the information replying method in this embodiment, dialog style information is searched for by using text content and contact information of to-be-replied information, a database corresponding to the dialog style information is searched by using preprocessed text content as query information, and appropriate reply information may be found for a user to perform selection and replying, so that the user does not need to manually input reply information, which can shorten time for replying the information by the user. Further, by setting a dialog style, a reply of which a style matches the to-be-replied information may be provided for the user, which improves user experience.

Figure 2:
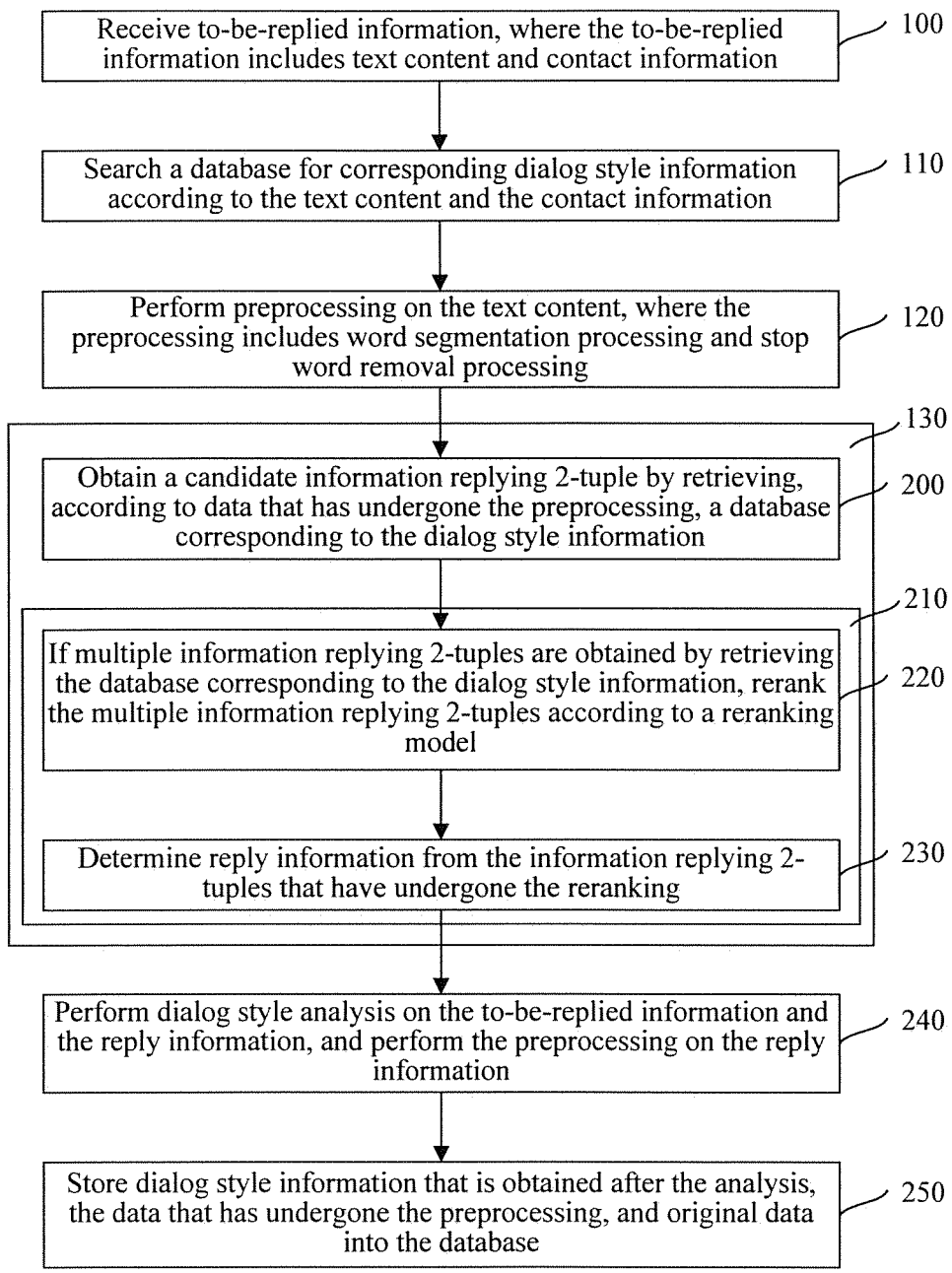
FIG. 2 shows a flowchart of an information replying method according to another embodiment of the present invention.

FIG. 2 shows a flowchart of an information replying method according to another embodiment of the present invention. In FIG. 2, a step which has a reference sign the same as that of a step in FIG. 1 has a same function. For brevity, detailed descriptions of these steps are omitted.

As shown in FIG. 2, a main difference between the information replying method shown in FIG. 2 and the information replying method shown in FIG. 1 lies in that step 130 may further include the following steps:

Step 200: Obtain a candidate information replying 2-tuple by retrieving, according to the data that has undergone the preprocessing, the database corresponding to the dialog style information.

Step 210: Determine the reply information from the information replying 2-tuple.

Specifically, in a possible implementation manner, the candidate information replying 2-tuple may be obtained by retrieving, according to the determined dialog style information and the data that has undergone the preprocessing, the database corresponding to the dialog style information. These information replying 2-tuples obtained by means of retrieving may be pushed to a user, and the user may select one reply from the information replying 2-tuples as the reply information according to a need of the user. In addition, the user may further perform some appropriate adjustment or modification on the reply information, so that the reply information is more appropriate. For example, with reference to the related description of the information replying method in the foregoing embodiment, the superior, Wang, of the user sends, to the user by means of an SMS message, the SMS message: Help me to book one air ticket, it may be determined, according to the text content and the contact information of the to-be-replied information, that a dialog style is a "respectful style for superiors/elders", and the query information "Help/me/to book/one/air ticket" may be obtained after the preprocessing. After the database corresponding to the dialog style information is retrieved, the following three candidate information replying 2-tuples may be obtained and pushed to the user: information 1 "Help me to book one air ticket to Hong Kong", and a reply 1 "Please wait a minute, I will get it done for you soon"; information 2 "Help me to book one air ticket to Shanghai", and a reply 2 "OK, when would you like to fly?"; and information 3 "Please book two air tickets to Shanghai for me, thanks!", and a reply 3 "OK, right away!". In the foregoing information replying 2-tuples obtained by means of retrieving, the user may select the reply 2 as reply information according to a need of the user, and perform appropriate modification on the reply 2 before replying. For example, the reply 2 may be modified to "OK, where would you like to go, and when would you like to fly?".

Further, step 210 may further include the following steps:

Step 220: If multiple information replying 2-tuples are obtained by retrieving the database corresponding to the dialog style information, rerank the multiple information replying 2-tuples according to a reranking model.

Step 230: Determine the reply information from the information replying 2-tuples that have undergone the reranking.

Specifically, in a possible implementation manner, if multiple (for example, 20) information replying 2-tuples are obtained in step 200 by means of retrieving, and in this case, if these information replying 2-tuples are directly pushed to the user, the user may be unable to select appropriate reply information quite quickly, and great user experience cannot be provided. A reranking model may be set in the mobile terminal. After the multiple information replying 2-tuples are obtained by means of retrieving, these information replying 2-tuples may be reranked according to the reranking model. After the reranking, an information replying 2-tuple that has a relatively high hotspot degree may be ranked in a high position and pushed to the user, where a relatively high hotspot degree indicates that an information replying 2-tuple is relatively frequently used by the user or that a probability that an information replying 2-tuple is used for replying is relatively high.

In a possible implementation manner, some characteristics may be extracted from the information replying 2-tuples obtained by means of retrieving and the to-be-replied information, where each characteristic has a corresponding characteristic value. Training, by means of learning, the reranking model is learning a characteristic weight of each characteristic. For reranking, according to the reranking model, the information replying 2-tuples obtained by means of retrieving, a ranking value for each information replying 2-tuple needs to be calculated. The ranking value may be used to indicate a correlation between an information replying 2-tuple and the to-be-replied information, where a larger ranking value indicates a stronger correlation and indicates that a position of the information replying 2-tuple after the reranking is higher. Specifically, a ranking value may be obtained by calculating according to the following formula:

$$score_{rerank}(msg_{new}, (msg, \text{reply})) = \sum_{i=1}^{n} w_i * f_i$$

where $msg_{new}$ indicates to-be-replied information, (msg, reply) indicates an information replying 2-tuple obtained by means of retrieving, msg and reply indicate information and a reply in an information replying 2-tuple respectively, n indicates a quantity of extracted characteristics, $f_i$ indicates a characteristic value of an $i^{th}$ characteristic, and $W_i$ is a characteristic weight of an $i^{th}$ characteristic.

The n characteristics herein may be preset by a developer, where the n characteristics may include the following characteristics: 1. a ranking value in an initial retrieval; 2. frequency that a reply is used by a user; 3. a quantity of words that are shared by $msg_{new}$ and msg; 4. a similarity between $msg_{new}$ and msg; 5. a quantity of words that are shared by $msg_{new}$ and reply; 6. a similarity between $msg_{new}$ and reply.

For example, the following three information replying 2-tuples are pushed to the user according to K=3 that is set:

information 1 "Help me to book one air ticket to Hong Kong" and a reply 1 "Please wait a minute, I will get it done for you soon";

information 2 "Help me to book one air ticket to Shanghai", and a reply 2 "OK, when would you like to fly?"; and information 3 "Please book two air tickets to Shanghai for me, thanks!", and a reply 3 "OK, right away!".

It is assumed that a fourth information replying 2-tuple obtained by means of retrieving is:

information 4 "Remember to help me to book one air ticket, thanks!", and a reply 4 "OK, where would you like to go, and when would you like to fly?".

When it is set that K=3, that is, in a case in which three information replying 2-tuples are pushed to the user, the user does not see the fourth information replying 2-tuple. Therefore, the user may select the second one and perform modification to obtain "OK, where would you like to go, and when would you like to fly?" to perform replying.

If the reranking model is used, a system may calculate a new ranking value, in a case of to-be-replied information $msg_{new}$, for each information replying 2-tuple (msg,reply) obtained by means of retrieving, and may rank the fourth information replying 2-tuple among the first three (even as the first), so that the user may directly select "OK, where would you like to go, and when would you like to fly?" from the three information replying 2-tuples that are pushed to the user according to K=3 that is set, as reply information to perform replying. In this way, not only precision of reply recommendation of the mobile terminal can be improved, but inconvenience brought by participation of the user in modification may be reduced to some extent, which further improves user experience on the mobile terminal.

It should be noted that, when the reranking model is not used, each information replying 2-tuple obtained by means of retrieving has a ranking value, which is referred to as an initial ranking value. This ranking value is obtained by calculating by using some simple statistical information. In the reranking model, the initial ranking value may be used as a characteristic (that is, the foregoing characteristic 1), and more characteristics (such as the foregoing characteristic 2 to characteristic 6) may further be considered. Therefore, the reranking model may obtain a new ranking value by using a more precise calculation method, so that a better ranking result is achieved.

In a possible implementation manner, in the information replying method according to the foregoing embodiment, two initial values (for example, N and K) may be set in the mobile terminal, where the initial value N may indicate a quantity of information replying 2-tuples obtained by means of retrieving, and the initial value K may indicate a quantity of to-be-selected-from information replying 2-tuples that are pushed to the user. For example, in the mobile terminal, initial values may be set as N=20 and K=3, and then when the database corresponding to the dialog style information is retrieved, N=20 candidate information replying 2-tuples need to be obtained by means of retrieving. After these information replying 2-tuples are reranked according to the reranking model, the first K=3 information replying 2-tuples are selected as to-be-selected-from information replying 2-tuples and pushed to the user for the user to perform selection, modification, and replying.

It should be noted that, a developer may set the two initial values. In addition, in a process in which the user uses the mobile terminal, the user may also modify the initial values according to a need of the user, so that better user experience is provided.

In a possible implementation manner, the information replying method may further include: training, by means of learning, the reranking model according to a first set period and according to data in the database.

Specifically, as the user uses the mobile terminal, there is an increasingly large amount of dialog data generated by SMS messages and an application client, and accordingly there are also more information replying 2-tuples stored in the database. As a result, accuracy of the reranking model that is set in an initial stage may decrease, and after reranking is performed according to the reranking model, an information replying 2-tuple that has a relatively high hotspot degree may not be ranked in a high position, which affects selection of the user.

In a possible implementation manner, in the mobile terminal, a first set period (for example, 30 days) may be set by a developer. The mobile terminal may automatically re-train, according to the first set period and by means of learning, a new reranking model according to an information replying correspondence that is indicated by the dialog data and the information replying 2-tuples in the database, so as to obtain a reranking model that has high accuracy, so that the user may quickly obtain reply information that is more appropriate. In another possible implementation manner, the user may modify the first set period according to a need of the user. For example, if the user rarely uses SMS messages and an application client such as WeChat and QQ Mobile, there is a quite small amount of dialog data generated by the SMS messages and the application client. In this case, accuracy of an initial reranking model may remain relatively high in quite a long time, and the user may prolong the first set period, for example, from 30 days to 100 days. If the user frequently uses SMS messages and an application client such as WeChat and QQ Mobile, there is a quite large amount of dialog data generated by the SMS messages and the application client. In this case, the accuracy of the initial reranking model may decrease in quite a short time, and the user may shorten the first set period, for example, from 30 days to 10 days.

By actively modifying the first set period by the user, and starting, at relatively appropriate frequency, a process of training the reranking model by means of learning, a problem of slow operation of the system resulting from excessively frequent training performed on the reranking model by means of learning can be avoided, and a problem of deterioration of user experience caused by a decrease in accuracy of the reranking model can also be avoided.

In a possible implementation manner, the information replying method may further include: performing statistical data analysis on data in the database according to a second set period to obtain statistical information of a word in the to-be-replied information, where the word is obtained after the word segmentation processing is performed on the text content in the to-be-replied information.

Step 130 may further include: obtaining the candidate information replying 2-tuple by retrieving, according to the data that has undergone the preprocessing and the statistical information, the database corresponding to the dialog style information.

Specifically, in the mobile terminal, a second set period (for example, 30 days) may be set by a developer. The mobile terminal may automatically perform, according to the second set period, statistical data analysis on the dialog data in the database and the data that has undergone the preprocessing to obtain statistical information, so that an information replying 2-tuple related to the to-be-replied information may be retrieved for according to the data that has undergone the preprocessing and the statistical information. In another possible implementation manner, the user may modify the second set period according to a need of the user. For a specific example, reference may be made to the related description of the information replying method in this embodiment.

In a possible implementation manner, after the word segmentation processing is performed on the text content in the to-be-replied information, corresponding words may be obtained. For example, according to the related description in the foregoing embodiment, after the preprocessing, multiple words "help/me/to book/one/air ticket" may be obtained. Statistical data analysis may be performed, according to the second set period, on words that are in the database and that are obtained after the preprocessing, and a probability that a word appears in a sentence or in a document, namely, word frequency, may be obtained. In a retrieving process, a retrieving result may be more precise if these pieces of statistical information are taken into consideration.

In a possible implementation manner, after step 130, the information replying method may further include the following steps:

Step 240: Perform dialog style analysis on the to-be-replied information and the reply information, and perform the preprocessing on the reply information.

Step 250: Store dialog style information that is obtained after the analysis, the data that has undergone the preprocessing, and original data into the database, where the original data includes the text content and the contact information of the to-be-replied information, and text content and contact information of the reply information.

Specifically, according to the steps in this embodiment and the foregoing embodiment, after the to-be-replied information is received, the reply information is determined, and replying is performed, the dialog style analysis may be performed on current dialog data, namely, the to-be-replied information and the reply information, and the preprocessing may also be performed on the reply information. The dialog style analysis means determining a dialog style of a current dialog. For a specific example of the preprocessing, reference may be made to the related description in the foregoing embodiment. The dialog style information that is obtained after the analysis, the data that has undergone the preprocessing, and the original data are stored into the database corresponding to the dialog style information, so as to be used for subsequent information replying.

It should be noted that, before the reply information is determined, a dialog style of the current dialog data has already been determined, but the dialog style of the dialog data may be changed after modification performed by the user on the reply information. In consideration of a deviation generated when the dialog style is determined and a dialog style change caused by modification performed by the user, dialog style analysis may further be performed again herein, so that the dialog data may be stored into a database corresponding to a most appropriate dialog style. The mobile terminal may store a result of the preprocessing performed on the to-be-replied information, and in an information replying process, the to-be-replied information does not change, and in this case, the preprocessing does not need to be performed on the to-be-replied information again.

According to the information replying method in this embodiment, a current dialog style is determined by using text content and contact information of to-be-replied information, a database corresponding to the dialog style is searched by using preprocessed text content as query information, and appropriate reply information may be found for a user to perform selection and replying, so that the user does not need to completely manually input reply information, which can shorten time for replying the information by the user. Further, by setting a dialog style, a reply of which a style matches the to-be-replied information may be provided for the user, which improves user experience.

Figure 3:
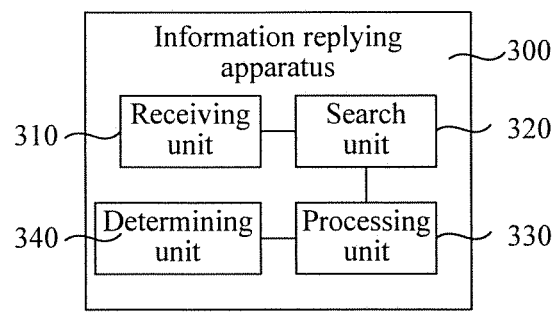
FIG. 3 shows a structural block diagram of an information replying apparatus according to another embodiment of the present invention.

FIG. 3 shows a structural block diagram of an information replying apparatus according to an embodiment of the present invention. As shown in FIG. 3, an information replying apparatus 300 may mainly include a receiving unit 310, a search unit 320, a processing unit 330, and a determining unit 340.

The receiving unit 310 is configured to receive to-be-replied information, where the to-be-replied information includes text content and contact information.

The search unit 320 is connected to the receiving unit 310 and configured to search a database for corresponding dialog style information according to the text content and the contact information.

Specifically, when a user uses a mobile terminal (such as a mobile phone and a tablet computer), in addition to communicating with another person by using an SMS message, the user may also communicate with another person by using various application clients (such as QQ Mobile, WeChat, and Weibo) after installing the various application clients in the mobile terminal. After receiving to-be-replied information that is sent by another person by using an SMS message or an application client, the receiving unit 310 may read, from the to-be-replied information, text content and contact information included in the to-be-replied information, where the text content is content in the to-be-replied information, and the contact information is related information, such as a name, a telephone number, and group information, of the contact, where the related information of the contact is stored in the mobile terminal by the user.

In a possible implementation manner, a database may be stored in the mobile terminal. In the database, text content that is generated in a process in which the user communicates with another person by using an SMS message or an application client may be stored according to different dialog styles. In the database, the text content may be stored in a form of an information replying 2-tuple. For example, the dialog styles may be set to a "respectful style for superiors/elders", a "casual style for friends/colleagues", an "intimate style for family members", and the like. If a superior, Wang, of the user sends, to the user by means of an SMS message, an SMS message: Help me to book one air ticket, the user replies: Please wait a minute, I will get it done for you soon. Information 1 "Help me to book one air ticket" and a reply 1 "Please wait a minute, I will get it done for you soon" may be stored in a dialog style database 1 for the "respectful style for superiors/elders".

After the receiving unit 310 receives the to-be-replied information, the search unit 320 may search the database for current dialog style information according to the text content and the contact information in the to-be-replied information, so that appropriate reply information may be found in the database corresponding to the dialog style information. For example, the receiving unit 310 receives information: Help me to book one air ticket, sent from a friend, Liu, text content is: Help me to book one air ticket, contact information may include a name: Liu, a group: Friends, and the like; and the search unit 320 may find, in the database according to the text content and the contact information, that a current dialog style information is a "casual style for friends/colleagues".

For a specific example of the dialog style information, reference may be made to the related description in the foregoing embodiment of the present invention, and details are not described herein again.

The processing unit 330 is connected to the search unit 320 and configured to perform preprocessing on the text content, where the preprocessing includes word segmentation processing and stop word removal processing.

Specifically, after the search unit 320 finds the current dialog style information, the processing unit 330 may perform the preprocessing on the text content in the to-be-replied information, where the preprocessing may include the word segmentation processing and the stop word removal processing on the text content. Different text content is constituted of several words or phrases. The word segmentation processing is splitting the text content according to words or phrases. For example, "Help me to book one air ticket" may be changed into "Help/me/to book/one/air ticket" after the word segmentation processing. In addition, the text content may include some stop words, such as a word "of" and words "and the like". These stop words have no influence on a query result, and therefore, these stop words may be removed by means of the stop word removal processing. In this way, workload of a searching process may be lightened, and an operating speed of a system may be increased.

The determining unit 340 is connected to the processing unit 330 and configured to search, according to data that has undergone the preprocessing, the database corresponding to the dialog style information, to determine reply information.

Specifically, after the processing unit 330 performs the preprocessing, original text content in the to-be-replied information may be changed into query information that is obtained after processing, so that the query information is used by the determining unit 340 to search the database corresponding to the dialog style information, and therefore the reply information that may be replied by the user is determined, where the dialog style information is the dialog style information that is found by the search unit 320.

In the mobile terminal, different dialog styles are set by making full use of contact information stored by the user and generated dialog data, and the generated dialog data is separately stored in a corresponding database according to the dialog style information. In this way, the dialog data of the user does not need to be uploaded to a remote cloud, which helps to protect privacy of the user.

According to the information replying apparatus in this embodiment, a search unit searches for dialog style information according to text content and contact information of to-be-replied information, and searches, by using text content preprocessed by a processing unit as query information, a database corresponding to the dialog style information, and appropriate reply information may be found for a user to perform selection and replying, so that the user does not need to manually input reply information, which can shorten time for replying the information by the user. Further, by setting a dialog style, a reply of which a style matches the to-be-replied information may be provided for the user, which improves user experience.

Figure 4:
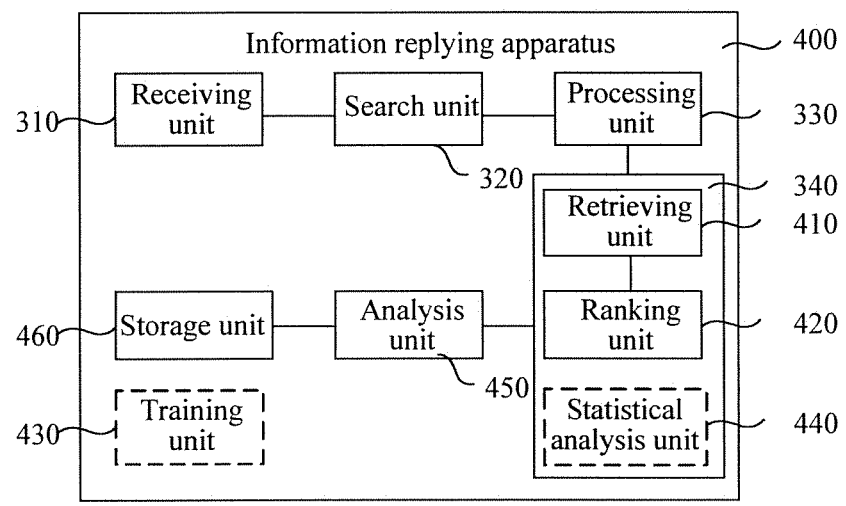
FIG. 4 shows a structural block diagram of an information replying apparatus according to another embodiment of the present invention.

FIG. 4 shows a structural block diagram of an information replying apparatus according to another embodiment of the present invention. In FIG. 4, a component of which a reference sign is the same as that of a component in FIG. 3 has a same function. For brevity, detailed descriptions of these steps are omitted.

As shown in FIG. 4, a main difference between an information replying apparatus 400 shown in FIG. 4 and the information replying apparatus 300 shown in FIG. 3 lies in that the determining unit 340 may further include:

a retrieving unit 410, connected to the processing unit 330, and configured to obtain a candidate information replying 2-tuple by retrieving, according to the data that has undergone the preprocessing, the database corresponding to the dialog style information, where the determining unit 340 is further configured to determine the reply information from the information replying 2-tuple.

Specifically, in a possible implementation manner, the retrieving unit 410 may obtain the candidate information replying 2-tuple by retrieving, according to the dialog style information found by the search unit 320 and the data preprocessed by the processing unit 330, the database corresponding to the dialog style information. The information replying apparatus 400 may push these information replying 2-tuples obtained by means of retrieving to a user, and the user may select one reply from the information replying 2-tuples as the reply information according to a need of the user. In addition, the user may further perform some appropriate adjustment or modification on the reply information, so that the reply information is more appropriate. For a specific example, reference may be made to the related description in the information replying method according to the foregoing embodiment of the present invention.

Further, the determining unit 340 may further include:

a ranking unit 420, connected to the retrieving unit 410, and configured to: if multiple information replying 2-tuples are obtained by retrieving the database corresponding to the dialog style information, rerank the multiple information replying 2-tuples according to a reranking model.

The determining unit 340 is further configured to determine the reply information from the information replying 2-tuples that have undergone the reranking.

Specifically, in a possible implementation manner, if the retrieving unit 410 obtains multiple (for example, 20) information replying 2-tuples by means of retrieving, and in this case, if the information replying apparatus 400 directly pushes these information replying 2-tuples to the user, the user may be unable to select appropriate reply information quite quickly, and great user experience cannot be provided. A reranking model may be set in the information replying apparatus. After the retrieving unit 410 obtains the multiple information replying 2-tuples by means of retrieving, the ranking unit 420 may rerank these information replying 2-tuples according to the reranking model. After the reranking, an information replying 2-tuple that has a relatively high hotspot degree may be ranked in a high position and pushed to the user, where a relatively high hotspot degree indicates that an information replying 2-tuple is relatively frequently used by the user or that a probability that an information replying 2-tuple is used for replying is relatively high. For a specific example of the reranking model and a reranking process, reference may be made to the related description in the information replying method according to the foregoing embodiment of the present invention.

In a possible implementation manner, in the information replying apparatus 400, two initial values (for example, N and K) may be set, where the initial value N may indicate a quantity of information replying 2-tuples that are obtained by the retrieving unit 410 by means of retrieving, and the initial value K may indicate a quantity of to-be-selected-from information replying 2-tuples that are pushed to the user by the information replying apparatus 400. For example, initial values may be set as N=20 and K=3, and then when the retrieving unit 410 retrieves the database corresponding to the dialog style information, N=20 information replying 2-tuples need to be obtained by means of retrieving. After the ranking unit 420 reranks these information replying 2-tuples according to the reranking model, the first K=3 information replying 2-tuples are selected as to-be-selected-from information replying 2-tuples and pushed to the user for the user to perform selection, modification, and replying.

It should be noted that, a developer may set the two initial values. In addition, in a process in which the user uses the mobile terminal, the user may also modify the initial values according to a need of the user, so that better user experience is provided.

In a possible implementation manner, the information replying apparatus 400 may further include:

a training unit 430, configured to train, by means of learning, the reranking model according to a first set period and according to data in the database.

Specifically, as the user uses the mobile terminal, there is an increasingly large amount of dialog data generated by SMS messages and an application client, and accordingly there are also more information replying 2-tuples stored in the database. As a result, accuracy of the reranking model that is set in an initial stage may decrease, and after the ranking unit 420 performs reranking according to the reranking model, an information replying 2-tuple that has a relatively high hotspot degree may not be ranked in a high position, which affects selection of the user.

In a possible implementation manner, in the information replying apparatus 400, a first set period (for example, 30 days) may be set by a developer. The training unit 430 may re-train, according to the first set period and by means of learning, a new reranking model according to an information replying correspondence that is indicated by the dialog data and the information replying 2-tuples in the database, so as to obtain a reranking model that has high accuracy, so that the user may quickly obtain reply information that is more appropriate. In another possible implementation manner, the user may modify the first set period according to a need of the user. For a specific example, reference may be made to the related description in the information replying method according to the foregoing embodiment of the present invention.

By actively modifying the first set period by the user, and starting, at relatively appropriate frequency, a process of training, by the training unit 430, the reranking model by means of learning, a problem of slow operation of the mobile terminal resulting from excessively frequent training performed on the reranking model by means of learning can be avoided, and a problem of deterioration of user experience caused by a decrease in accuracy of the reranking model can also be avoided.

In a possible implementation manner, the information replying apparatus 400 may further include:

a statistical analysis unit 440, configured to perform statistical data analysis on data in the database according to a second set period to obtain statistical information of a word in the to-be-replied information, where the word is obtained after the word segmentation processing is performed on the text content in the to-be-replied information, where the determining unit 340 is further configured to obtain the candidate information replying 2-tuple by retrieving, according to the data that has undergone the preprocessing and the statistical information, the database corresponding to the dialog style information.

Specifically, in the information replying apparatus 400, a second set period (for example, 30 days) may be set by a developer. The statistical analysis unit 440 may automatically perform, according to the second set period, statistical data analysis on the dialog data in the database and the data that has undergone the preprocessing to obtain statistical information, so that the determining unit 340 may retrieve, according to the data that has undergone the preprocessing and the statistical information, for an information replying 2-tuple related to the to-be-replied information. In another possible implementation manner, the user may modify the second set period according to a need of the user. For a specific example, reference may be made to the related description of the information replying method according to the foregoing embodiment of the present invention.

In a possible implementation manner, after the word segmentation processing is performed on the text content in the to-be-replied information, corresponding words may be obtained. For example, according to the related description in the foregoing embodiment, after the preprocessing, multiple words "help/me/to book/one/air ticket" may be obtained. The statistical analysis unit 440 may perform, according to the second set period, statistical data analysis on words that are in the database and that are obtained after the preprocessing, so as to obtain a probability that a word appears in a sentence or in a document, namely, word frequency. In a process in which the retrieving unit 410 performs the retrieving, a retrieving result may be more precise if these pieces of statistical information are taken into consideration.

In a possible implementation manner, the information replying apparatus 400 may further include:

an analysis unit 450, connected to the determining unit 340, and configured to perform dialog style analysis on the to-be-replied information and the reply information, and perform the preprocessing on the reply information; and a storage unit 460, connected to the analysis unit 450, and configured to store dialog style information that is obtained after the analysis, the data that has undergone the preprocessing, and original data into the database, where the original data includes the text content and the contact information of the to-be-replied information, and text content and contact information of the reply information.

Specifically, according to the information replying apparatus in this embodiment and the foregoing embodiment, after the receiving unit 310 receives the to-be-replied information, the determining unit 340 determines the reply information, and replying is performed, the analysis unit 450 may perform the dialog style analysis on current dialog data, namely, the to-be-replied information and the reply information, and may also perform the preprocessing on the reply information. The dialog style analysis means determining dialog style information of current dialog data. For a specific example of the preprocessing, reference may be made to the related description in the information replying method according to the foregoing embodiment of the present invention. The storage unit 460 may store the dialog style information obtained by the analysis unit 450, the data that has undergone the preprocessing, and original dialog data into the database corresponding to the dialog style information, so as to be used for subsequent information replying.

It should be noted that, the search unit 320 has already determined the dialog style information of the current dialog data, but the dialog style information of the dialog data may be changed after modification performed by the user on the reply information. In consideration of a deviation generated when the search unit 320 searches for the dialog style information and a dialog style change caused by modification performed by the user, dialog style analysis is performed again, so that the storage unit 460 may store the dialog data into a database corresponding to most appropriate dialog style information. The mobile terminal may store a result of the preprocessing performed on the to-be-replied information, and in an information replying process, the to-be-replied information does not change, and in this case, the preprocessing does not need to be performed on the to-be-replied information again.

According to the information replying apparatus in this embodiment, a search unit searches for dialog style information according to text content and contact information of to-be-replied information, and searches, by using text content preprocessed by a processing unit as query information, a database corresponding to the dialog style information, and appropriate reply information may be found for a user to perform selection and replying, so that the user does not need to manually input reply information, which can shorten time for replying the information by the user. Further, by setting a dialog style, a reply of which a style matches the to-be-replied information may be provided for the user, which improves user experience.

Figure 5:
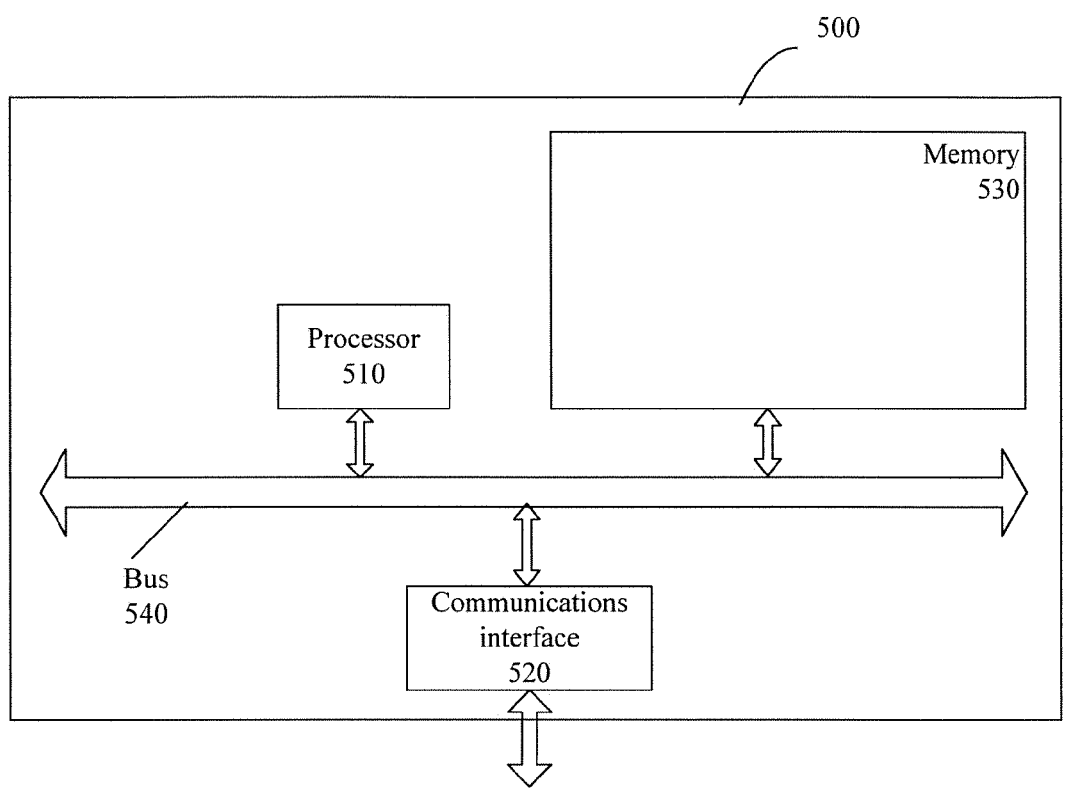
FIG. 5 shows a structural block diagram of an information replying apparatus according to another embodiment of the present invention.

FIG. 5 shows a structural block diagram of an information replying apparatus according to another embodiment of the present invention. An information replying apparatus 500 may be a host server, a personal computer PC, or a portable computer or mobile terminal that can be carried, and the like, which has a computational capability. A specific implementation of a computing node is not limited in a specific embodiment of the present invention.

The information replying apparatus 500 includes a processor (processor) 510, a communications interface (Communications Interface) 520, a memory (memory) 530, and a bus 540, where the processor 510, the communications interface 520, and the memory 530 communicate with each other by using the bus 540.

The communications interface 520 is configured to communicate with a network device, where the network device includes, for example, a virtual machine management center and a shared storage.

The processor 510 is configured to execute a program. The processor 510 may be a central processing unit CPU or an application-specific integrated circuit ASIC (Application-Specific Integrated Circuit), or may be configured as one or more integrated circuits for implementing the embodiments of the present invention.

The memory 530 is configured to store a file. The memory 530 may include a high speed RAM memory, and may also include a non-volatile memory (non-volatile memory), for example, at least one disk memory. The memory 530 may also be a memory array. The memory 530 may also be divided into blocks, and the blocks can be combined into a virtual volume according to a specific rule.

In a possible implementation manner, the foregoing program may be program code including a computer operating instruction. The program may be specifically used for:

receiving to-be-replied information, where the to-be-replied information includes text content and contact information;

searching a database for corresponding dialog style information according to the text content and the contact information;

performing preprocessing on the text content, where the preprocessing includes word segmentation processing and stop word removal processing; and searching, according to data that has undergone the preprocessing, the database corresponding to the dialog style information, to determine reply information.

In a possible implementation manner, the searching, according to data that has undergone the preprocessing, the database corresponding to the dialog style information, to determine reply information includes:

obtaining a candidate information replying 2-tuple by retrieving, according to the data that has undergone the preprocessing, the database corresponding to the dialog style information; and determining the reply information from the information replying 2-tuple.

In a possible implementation manner, the determining the reply information from the information replying 2-tuple includes:

if multiple information replying 2-tuples are obtained by retrieving the database corresponding to the dialog style information, reranking the multiple information replying 2-tuples according to a reranking model; and determining the reply information from the information replying 2-tuples that have undergone the reranking.

In a possible implementation manner, the program is further used for:

training, by means of learning, the reranking model according to a first set period and according to data in the database.

In a possible implementation manner, the searching, according to data that has undergone the preprocessing, the database corresponding to the dialog style information, to determine reply information further includes:

performing statistical data analysis on data in the database according to a second set period to obtain statistical information of a word in the to-be-replied information, where the word is obtained after the word segmentation processing is performed on the text content in the to-be-replied information; and obtaining the candidate information replying 2-tuple by retrieving, according to the data that has undergone the preprocessing and the statistical information, the database corresponding to the dialog style information.

In a possible implementation manner, the program is further used for:

performing dialog style analysis on the to-be-replied information and the reply information, and performing the preprocessing on the reply information; and storing dialog style information that is obtained after the analysis, the data that has undergone the preprocessing, and original data into the database, where the original data includes the text content and the contact information of the to-be-replied information, and text content and contact information of the reply information.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present invention.

If the functions are implemented in a form of computer software and sold or used as an independent product, it can be deemed to some extent that all or some of the technical solutions of the present invention (for example, the part contributing to the prior art) are implemented in a form of a computer software product. The computer software product is generally stored in a computer readable non-volatile storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information replying method, comprising:
    receiving to-be-replied information comprising text content and contact information;
    searching a database stored in a mobile terminal for corresponding dialog style information according to the text content and the contact information;
    performing preprocessing on the text content, wherein the preprocessing comprises word segmentation processing and stop word removal processing;
    obtaining multiple candidate information replying 2-tuples by retrieving, according to data that has undergone the preprocessing, from the database corresponding to the dialog style information, wherein each candidate information replying 2-tuple comprises a message and a reply;
    reranking the multiple candidate information replying 2-tuples according to a reranking model, wherein the reranking model comprises a ranking value in an initial retrieval, a frequency that a reply is selected by a user, and a quantity of words that are shared by messages corresponding to two candidate information replying 2-tuples;
    determining reply information from the multiple candidate information replying 2-tuples that have undergone the reranking; and
    presenting the reply information on the mobile terminal for selection by a user.

2. The information replying method according to claim 1, wherein the dialog style information comprises:
    dialog style information pre-stored in the database in the mobile terminal; or
    dialog style information generated by the mobile terminal when the mobile terminal responds to a user operation.

3. The information replying method according to claim 1, further comprising:
    training the reranking model according to a first set period and according to data in the database.

4. The information replying method according to claim 1, further comprising:
    performing statistical data analysis on data in the database according to a second set period to obtain statistical information of a word in the to-be-replied information, wherein the word is obtained after the word segmentation processing is performed on the text content in the to-be-replied information; and
    obtaining the candidate information replying 2-tuple by retrieving, according to the data that has undergone the preprocessing and the statistical information, from the database corresponding to the dialog style information.

5. The information replying method according to claim 1, further comprising:
    performing dialog style analysis on the to-be-replied information and the reply information, and performing preprocessing on the reply information; and
    storing dialog style information obtained after the analysis, the data that has undergone the preprocessing, and original data into the database, wherein the original data comprises the text content and the contact information of the to-be-replied information, and text content and contact information of the reply information.

6. An information replying apparatus, comprising:
    a communications interface configured to receive to-be-replied information comprising text content and contact information; and
    at least one processor configured to:
        search a database stored in a mobile terminal for corresponding dialog style information according to the text content and the contact information;
        perform preprocessing on the text content, wherein the preprocessing comprises word segmentation processing and stop word removal processing;
        obtain multiple candidate information replying 2-tuples by retrieving, according to data that has undergone the preprocessing, from the database corresponding to the dialog style information, wherein each candidate information replying 2-tuple comprises a message and a reply;
        rerank the multiple candidate information replying 2-tuples according to a reranking model, wherein the reranking model comprises a ranking value in an initial retrieval, a frequency that a reply is selected by a user, and a quantity of words that are shared by messages corresponding to two candidate information replying 2-tuples;
        determine reply information from the multiple candidate information replying 2-tuples that have undergone the reranking; and
        present the reply information on the mobile terminal for selection by a user.

7. The information replying apparatus according to claim 6, wherein the dialog style information comprises:
    dialog style information pre-stored in the database in the mobile terminal; or
    dialog style information generated by the mobile terminal when the mobile terminal responds to a user operation.

8. The information replying apparatus according to claim 6, wherein the at least one processor is further configured to:
    train the reranking model according to a first set period and according to data in the database.

9. The information replying apparatus according to claim 6, wherein the at least one processor is further configured to:
    perform statistical data analysis on data in the database according to a second set period to obtain statistical information of a word in the to-be-replied information, wherein the word is obtained after the word segmentation processing is performed on the text content in the to-be-replied information; and
    obtain the candidate information replying 2-tuple by retrieving, according to the data that has undergone the preprocessing and the statistical information, from the database corresponding to the dialog style information.

10. The information replying apparatus according to claim 6, wherein the at least one processor is further configured to:
    perform dialog style analysis on the to-be-replied information and the reply information, and perform the preprocessing on the reply information; and
    store dialog style information that is obtained after the analysis, the data that has undergone the preprocessing, and original data into the database, wherein the original data comprises the text content and the contact information of the to-be-replied information, and text content and contact information of the reply information.

\* \* \* \* \*